Jan. 31, 1956 J. C. HOBBS 2,732,855
VALVE
Filed Aug. 25, 1950
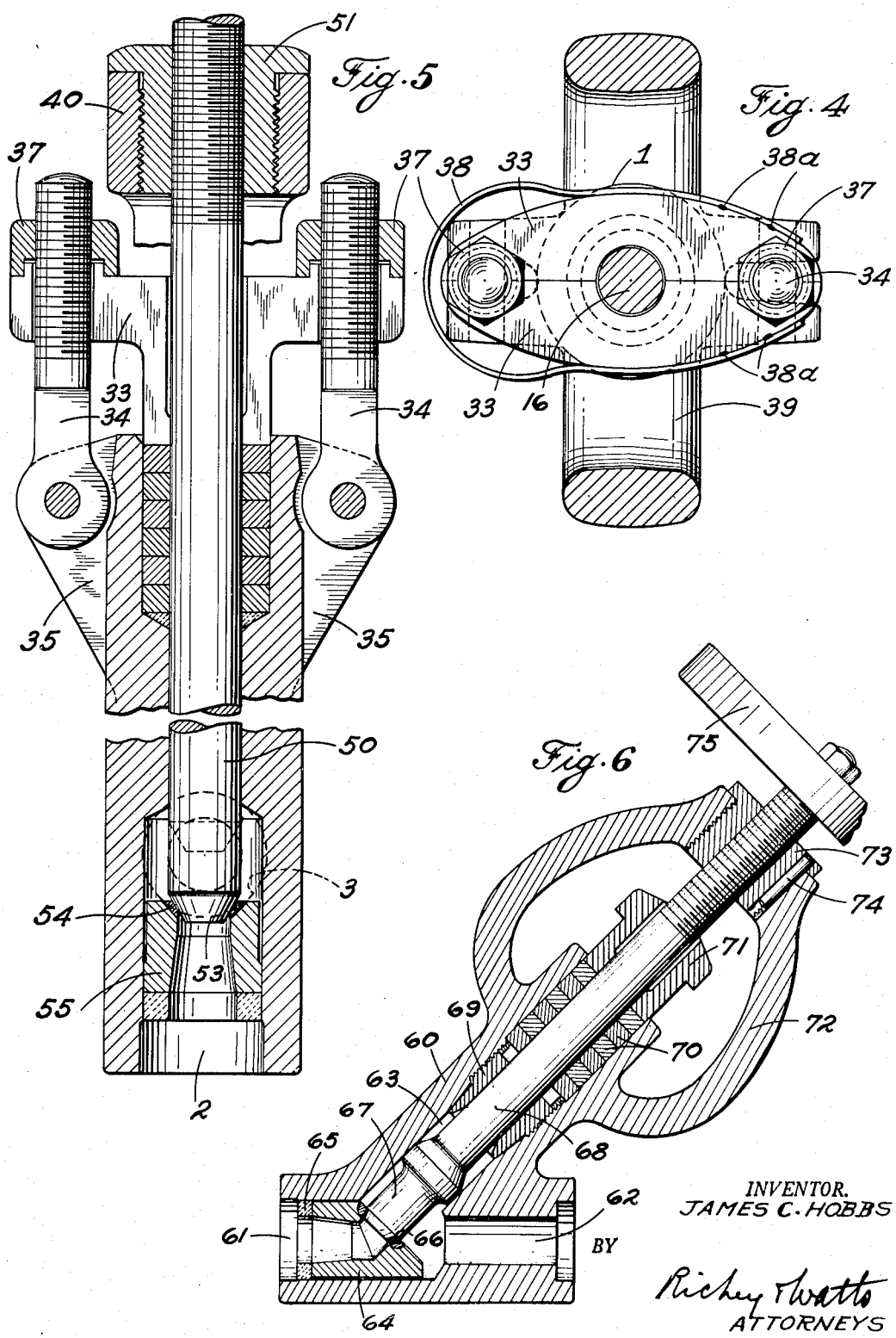
INVENTOR.
JAMES C. HOBBS
BY
Richey & Watts
ATTORNEYS

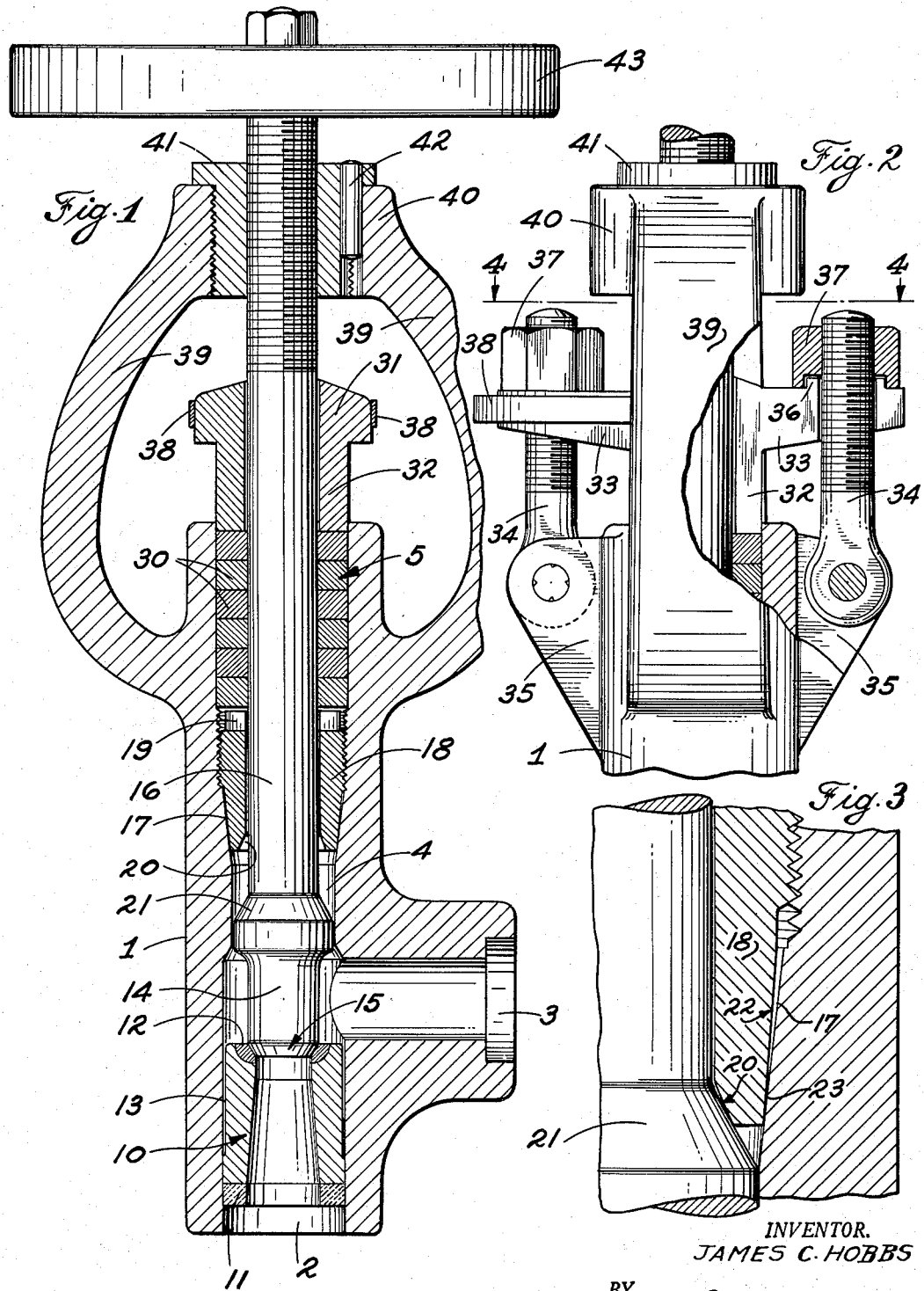

United States Patent Office 2,732,855
Patented Jan. 31, 1956

2,732,855

VALVE

James Clarence Hobbs, Coral Gables, Fla.

Application August 25, 1950, Serial No. 181,353

9 Claims. (Cl. 137—338)

This invention relates generally to the valve art and more particularly to a new valve suited for use with high-pressure, high-temperature fluid.

In the recent past, there has been a great increase in the pressures and temperatures of fluids used industrially, for example, steam in power plants. This increase has exceeded the growth and development of the valve industry as a whole, particularly in valves of the smaller sizes. As a result, the only small valves obtainable at the present time are not suitable for use with high-pressure, high-temperature fluids.

Some of the troubles which make up this problem and which are present in conventional valves are as follows: There is leakage of fluid at the bonnet joint, at the packing gland due partly to disintegration of the packing by being excessively heated, and past the valve seat due to wear of the valve disk when the valve is seated and to wear due to vibration. The valves are bulky and thus overcrowd the working space around the equipment and instrument boards with which they are used and they are heavy and thus impose overstresses on the small pipes to which they are connected. The stem, yoke and body are overstressed due to differential temperature expansions with resultant leakage. The valves tend to freeze in closed position due to the greater contraction of the body than of the valve stem and to freeze in open position due to greater contraction of the stem than of the bonnet and yoke. Bolts and gaskets are used at the bonnet joints and are susceptible to failure.

This problem of satisfactorily handling high-pressure, high-temperature fluids, particularly in the smaller pipe lines, has existed for a considerable time and has not been solved by others to my knowledge.

The present invention aims to avoid these many troubles and attains these objects by providing valves consisting of new combinations of parts which have new modes of operation and which give new results. These new valves are bonnetless and thus avoid the prior difficulties traceable to bonnets. Leakage of fluid past the valve seat and around the valve stem, overheating of the stem packing and freezing of the parts in valve open or closed position are avoided by a new combination of sealing and cooling means and a flexible yoke. These valves are much less bulky and weigh much less than conventional valves and thus require less space, are less hazardous and are less expensive.

The present invention will be better understood by those skilled in the art from these general statements and the following description and the drawings which accompany it and in which:

Fig. 1 is a central, longitudinal, cross-sectional view through one form of valve embodying the present invention;

Fig. 2 is a fragmentary, side, elevational view, partly in section, of the valve of Fig. 1;

Fig. 3 is an enlarged, fragmentary view of the back seat in assembled position with the body and stem;

Fig. 4 is a sectional view, partly in elevation, taken on line 4—4 of Fig. 1;

Fig. 5 is a view similar to Fig. 1 but showing a modified form of the present invention; and Fig. 6 is a view similar to Fig. 1 but showing an angle type valve embodying the present invention.

The valve of Figs. 1 to 4, inclusive, comprises a body 1 having an inlet port 2, an outlet port 3 and a valve-receiving opening 4 which is opposed to the inlet port and is provided in its outer end with a packing chamber or stuffing box 5. It will, of course, be understood that if desired the direction of fluid flow through the valve may be changed so that port 3 will become the inlet port and port 2 the outlet port.

A prefabricated, tubular valve seat part or seat ring 10 is secured in the port 2 preferably by being welded at its outer end to body 1, the welding metal being indicated at 11. The valve seat surface 12 at the other end is preferably composed of hard, wear-resistant metal. This part 10 is flexible due to the clearance indicated at 13 between its outer surface for much of its length and the inner surface of the port. Due to this clearance the part may flex or deflect to align its seating surface 12 with the valve in case of any slight misalignment. Valve 14 is slidable in the inner end of opening 4, has an annular surface 15 near its inner end to seat on surface 12 and seal against flow of fluid therebetween and is connected to stem 16 which extends through and beyond the outer end of opening 4. Outwardly from the cylindrical portion of the opening 4 in which valve 14 slides, the opening tapers, as is indicated at 17, and then becomes cylindrical again where it is threaded to receive the threaded part of annular back seat 18. The back seat 18 is preferably provided with recesses 19 on its outer end for reception of a socket wrench by which it may be readily assembled with, or removed from, its illustrated position in the valve body. Preferably, the back seat has left-hand threads so that it will not be unscrewed when engaged by valve 14 at the end of its opening movement. This back seat has a substantially cylindrical inner surface which has a close sliding fit on stem 16 and which flares outwardly at its inner end to provide an annular surface 20. This surface makes a small included angle (about 1° to about 3°) with surface 21 at the outer end of valve 14 and initially engages that surface on a narrow annular area. The outer surface 22 of back seat 18 near its inner end is tapered inwardly at a similar small included angle to the correspondingly tapered surface 23 of the valve body. By reason of this inclination of surfaces 22 and 23 to each other, they will engage each other on a narrow annular line or area when initially assembled. When the surface 21 of valve 14 is pressed against surface 20 of back seat 18, the annular contact areas between surfaces 20 and 21 and surfaces 22 and 23 may be increased and, hence, the sealing action between the valve body and the back seat and between the back seat and the valve will increase with increases in fluid pressure within the valve body or force applied to the piston through the valve stem. Thus there is pressure sealing between the valve body, back seat and stem.

Annular packing 30 surrounds stem 16 in packing chamber 5 and is held in place, and compressed, if desired, by a gland 31 which includes a cylindrical part 32 to enter the packing chamber 5 around stem 16 and arms 33 which project therefrom to beyond a projection of the body 1. Each arm has a hole through which may extend bolts 34 which are pivotally connected to ears 35 integral with and extending outwardly in pairs from the valve body in the region of the packing chamber 5. An upstanding rib 36 surrounds each hole 33 and nuts 37 on bolts 34 have recessed under surfaces to receive and surround these ribs. Preferably, the gland is split lengthwise of the arms and through the bolt and stem holes.

When the nuts 37 are screwed down against arms 33 the two parts of the gland are retained in position by the nuts and ribs 36 and the part 32 is pressed against packing in the packing chamber without any tendency for the parts of the gland to move away from each other.

A spring clip 38 approximately encircles arms 33 of gland 31, is secured thereto as by spot welds 38a and serves to hold together the parts of the gland and thereby to facilitate assembly and disassembly of the gland with the valve stem and bolts. As will be noted, space is present in the clip in which the arms may be moved to clear the bolts 34.

A yoke is integral with the valve body in the region of packing chamber 5 and comprises two spring legs 39 which are integral with and extend outwardly from the body between ears 35 and are connected at their upper ends to cylinder 40. A yoke nut 41 extends through cylinder 40, has a threaded connection therewith and is prevented from rotation in the yoke by a locking pin 42. The stem 16 extends through this nut and has screw-threaded engagement therewith. Hand wheel 43 serves as a means of rotating stem 16.

When the gland is to be removed, it is necessary only to remove nuts 37 from bolts 34 and then slip the gland parts up out of the valve body and off the bolts and remove them through the spaces between the legs of the yoke. They may be assembled by reversing this procedure. In this way the packing may be replaced without disturbing any other parts of the valve.

It will be understood that when the valve of Figs. 1 to 4 is in operation, full communication between ports 2 and 3 may be established by actuating the hand wheel 43 and retracting the valve 14 until its surface 21 seats with sealing engagement on surface 20 of back seat 18. Fluid may not escape between back seat 18 and either valve body 1 or stem 16 because of the initial sealing contacts between the opposed surfaces of these parts near the inner end of the back seat or because of an increase in the areas of these contacts with increases in forces urging the valve 14 against the back seat. Thus, as the pressure of fluid within the valve increases, the sealing action between the back seat, valve body and valve increases. Since the back seat 18 is preferably made of a metal which is softer and has a higher coefficient of expansion than the metal of the valve and the body, it also forms an effective seal with the surfaces of both the body and valve.

The connection of the yoke legs and the ears 25 to the valve body in the region of the packing chamber 5 and the facility with which heat may be radiated by these parts affords means for cooling or dissipating heat from the cooling chamber and thereby keeping the temperature of the packing below the point where the packing is in danger of being damaged or disintegrating. Each of the legs and ears is integral with the body near the inner end of chamber 5, that is the end of the stuffing box which is nearer to the valve 14, and thus has good heat conducting connection thereto and can conduct heat away from the body before it can reach parts of the body about that chamber. Each leg and ear is exposed on all sides to the air and thus may be cooled effectively thereby. This cooling action is new and quite important particularly when asbestos packing is used because it prevents deterioration of the packing due to overheating.

The valve of Fig. 5 is quite like the valve of Figs. 1 to 4, differing therefrom essentially in the construction of the valve and stem and in the omission of the back seat. In the valve of Fig. 5, the stem 50 is straight and, preferably, hardened and smoothly finished all over. At its outer end it is threaded to engage in the yoke nut 51 but the threads are limited in length to prevent withdrawal of the stem and valve a greater distance than is necessary to attain the desired flow of fluid through the body. The inner end of stem 50 has a surface 53 suitably shaped to make sealing engagement with the opposed surface 54 of valve seat 55. The operation of the valve of Fig. 5 is substantially the same as that of Fig. 1 except for the absence of the functions traceable to the back seat 18.

The angle valve shown in Fig. 6 includes a body 60 having ports 61 and 62 and a valve-receiving opening 63. A valve seat 64 is welded, as at 65, in port 61 and has an annular surface 66 at its other end to be engaged with fluid sealing contact by valve 67 in the valve-receiving opening 63. Ears, bolts and nuts (not shown) similar to parts 35, 34 and 37 of Figs. 1 to 5 are used to retain the gland 71 in place and, preferably, the gland has a clip thereon like clip 38 of Figs. 1 to 5. The stem 68, back seat 69, packing 70, gland 71, yoke 72, yoke nut 73, locking pin 74, hand wheel 75 and the means for securing the gland in position are all substantially the same as are shown in Fig. 1. The operation of the valve of Fig. 6 is substantially the same as that of valves of Fig. 1.

From the foregoing description it will be understood that the spring yoke serves several purposes. It acts as an abutment against which force may react and move the valve toward and away from its seats. It acts as a means of dissipating heat from the body in the vicinity of the packing chamber. Due to its springiness which is traceable to the curved shape of its legs, the yoke permits the stem to be rotated through a considerable angle after the valve contacts its seat. Such rotation causes the valve to clean and grind, and thus renew the seating surface each time contact is made. In addition, the spring yoke provides the resiliency necessary to prevent the stem from being "frozen" in the body in either open or closed position. Any tendency for the body to change its length at a greater rate or to a greater extent than the stem will be compensated for by springing or flexing of the yoke legs and, hence, damage to the seats, as well as freezing of the parts will be prevented. Also, the yoke legs and the ears interfere with the application of heat insulating material to the valve-receiving part of the body and, hence, facilitate radiation of heat from the body between and outwardly beyond the inner ends of said legs and ears.

Having thus described the present invention so that others skilled in the art may be able to understand and practice the same, I state that what I desire to secure by Letters Patent is defined in what is claimed.

What is claimed is:

1. A valve comprising a one piece body having an inlet port, an outlet port and a combined valve-receiving opening and stuffing box, a valve seat in one of said ports, a stem having a valve at its inner end to engage said seat with fluid-sealing contact and extending out through said valve-receiving opening and stuffing box, packing in said box around said stem, and means to minimize heat transfer from the body to the packing, said means including a yoke integral at one end with said body adjacent to the inner end of said stuffing box, said yoke being connected at its other end to said stem.

2. A valve comprising a one-piece body having an inlet port, an outlet port and a combined valve-receiving opening and stuffing box, a valve seat in the port opposed to said opening, a stem having a valve on its inner end to engage the seat on said ring with fluid-sealing contact and extending out through said valve-receiving opening and stuffing box, a gland on the outer end of the stuffing box, packing in the box around said stem and engaged at its outer end by said gland, and means to minimize heat transfer from the body to the packing, said means including a yoke integral at one end with said body adjacent to the inner end of said stuffing box and extending beyond said gland, said yoke being connected at its outer end to said stem and including opposed arc-shaped legs inclined at angles to the stem and being yieldable under forces applied thereto by said stem.

3. A valve comprising a one-piece body having an inlet port, an outlet port and a combined valve-receiving opening and stuffing box, a valve seat in the port opposed to said opening, a stem having a valve at its inner end to engage said seat with fluid-sealing contact and extending out through said valve-receiving opening and stuffing box, packing in said box around said stem, and means to minimize heat transfer from the body to the packing, said means including a yoke integral at one end with said body adjacent to the inner end of said stuffing box and ears integral with the body adjacent to the inner end of the stuffing box, and means including bolts connected to said ears for urging said gland against packing in said stuffing box.

4. A valve comprising a body having an inlet port, an outlet port and a combined valve-receiving opening and stuffing box; a valve seat in the port opposed to said opening; an elongated, tubular member in the valve-receiving opening, fixed against axial movement and having a smooth, substantially cylindrical bore, said member having a distortable inner end provided with outer and inner annular surfaces; a stem having a valve on its inner end to engage the seat in said body with fluid-sealing contact, a smooth, substantially cylindrical surface slidably and guidingly engaging said bore and extending out through said stuffing box and having a back valve to engage said inner annular surface on said elongated member with fluid-sealing contact and to press said outer annular surface against the adjacent surface of the valve-receiving opening with fluid-sealing contact; and a yoke connected at one end with said body and at its outer end to said stem.

5. A valve comprising a body having an inlet port, an outlet port and a combined valve-receiving opening and stuffing box; a valve seat in the port opposed to said opening; an elongated, tubular member in the valve-receiving opening having a smooth, substantially cylindrical bore, an outer end connected to the body and an inner end provided with outer and inner conical surfaces; a stem having a valve on its inner end to engage the seat on said ring with fluid-sealing contact, a smooth, substantially cylindrical surface slidably engaging said bore and extending out through said stuffing box and having a back valve to engage said inner conical surface on said elongated member with fluid-sealing contact, said outer conical surface engaging with an adjacent conical surface of the valve-receiving opening with fluid-sealing contact; and a yoke connected at one end of the said body and extending beyond said box and connected at its outer end to said stem.

6. A valve comprising a body having an inlet port, an outlet port and a combined valve-receiving opening and stuffing box, a ring insertable into said body through the port opposed to said valve-receiving opening and having a valve seat at its inner end and a fluid-tight connection at its outer end to said body, an elongated, tubular member insertable into said body through said stuffing box having its outer end connected to the body and having inner and outer conical surfaces at its inner end, said outer conical surface making a small included angle with the adjacent surface of said valve-receiving opening, a stem having a valve on its inner end to engage the seat on said ring with fluid-sealing contact and having a back valve to engage said inner conical seat on said tubular member with fluid-sealing contact, said stem extending out through said tubular member and stuffing box, and a yoke connected at one end with said body and extending beyond said box and connected at its outer end to said stem.

7. A valve comprising a body having an inlet port, an outlet port and a combined valve-receiving opening and stuffing box, a ring insertable into said body through the port opposed to said valve-receiving opening and having a valve seat at its inner end and a fluid-tight connection at its outer end to said body, an elongated, tubular member in the valve-receiving opening having a left-handed threaded connection at its outer end to the body and an inner end provided with outer and inner annular surfaces, a stem having a valve on its inner end to engage the seat on said ring with fluid-sealing contact, a back valve to engage said inner annular surface on said elongated member with fluid-sealing contact, said outer annular surface engaging with an adjacent surface of the valve-receiving opening with fluid-sealing contact, said stem extending out through said tubular member and stuffing box, a yoke connected at one end of the said body and means including right-handed threads in the outer end of said yoke for moving said stem endwise.

8. A valve comprising a body having an inlet port, an outlet port and a combined valve-receiving opening and stuffing box, a ring insertable into said body through the port opposed to said valve-receiving opening and having a valve seat at its inner end and a fluid-tight connection at its outer end to said body, an elongated, tubular member in the valve-receiving opening having a stem-receiving bore, a connection near its outer end to the body and an inner end provided with an inner annular seat, and an outer annular surface engageable with an adjacent surface of said body with fluid-sealing contact, a stem having a valve on its inner end to engage the seat on said ring with fluid-sealing contact, and a back valve to engage said inner annular seat on said elongated member with fluid-sealing contact, the metal of said tubular member having a higher thermal coefficient of expansion than that of said body, a gland at the outer end of the stuffing box, and a yoke connected at one end with said body and extending beyond said gland and connected at its outer end to said stem.

9. A valve comprising a body having an inlet port, an outlet port and a combined valve-receiving opening and stuffing box, a ring insertable into said body through the port opposed to said valve-receiving opening and having a valve seat at its inner end and a fluid-tight connection at its outer end to said body, an elongated, tubular member in the valve-receiving opening having a stem-receiving bore, a connection near its outer end to the body and an inner end provided with an inner conical seat surface, and an outer conical surface positioned to engage an adjacent conical surface of the valve-receiving opening with fluid-sealing contact, a stem having a valve on its inner end to engage the seat on said ring with fluid-sealing contact, and a back valve to engage said inner conical seat surface with fluid-sealing contact, the metal of said tubular member having a lower modulus of elasticity and being softer than that of said body, a gland at the outer end of the stuffing box, and a yoke connected at one end with said body and extending beyond said gland and connected at its outer end to said stem.

References Cited in the file of this patent

UNITED STATES PATENTS

| | | |
|---|---|---|
| 687,864 | Smyth | Dec. 3, 1901 |
| 765,111 | Turnbach | July 12, 1904 |
| 773,661 | Mann | Nov. 1, 1904 |
| 1,034,696 | Daniels | Aug. 6, 1912 |
| 1,038,085 | Chubbuck | Sept. 10, 1912 |
| 1,172,474 | Madigan | Feb. 22, 1916 |
| 1,483,631 | Forbes | Feb. 12, 1924 |
| 1,558,789 | Carrey | Oct. 27, 1925 |
| 1,697,608 | Patterson | Jan. 1, 1929 |
| 1,740,997 | McGuire | Dec. 24, 1929 |
| 1,745,667 | Fox | Feb. 4, 1930 |
| 1,825,543 | Redding | Sept. 29, 1931 |
| 1,995,395 | Mohr | Mar. 26, 1935 |
| 2,006,712 | Forbes | July 2, 1935 |
| 2,233,673 | Mayer | Mar. 4, 1941 |
| 2,260,523 | Henry | Oct. 28, 1941 |
| 2,316,957 | Hehemann | Apr. 20, 1943 |
| 2,399,102 | Carver | Apr. 23, 1946 |
| 2,507,851 | Bryant | May 16, 1950 |
| 2,563,012 | Dopp et al. | Aug. 7, 1951 |

FOREIGN PATENTS

| | | |
|---|---|---|
| 116,200 | Australia | 1942 |